United States Patent [19]
Macbeth

[11] 3,952,506
[45] Apr. 27, 1976

[54] ROCKET MOTOR CONSTRUCTION
[75] Inventor: Albert W. Macbeth, Brigham City, Utah
[73] Assignee: Thiokol Corporation, Newtown, Pa.
[22] Filed: Nov. 7, 1973
[21] Appl. No.: 413,477

[52] U.S. Cl. ............................ 60/255; 102/103; 60/39.47
[51] Int. Cl.² .................................... F02K 9/04
[58] Field of Search ............... 60/253, 255, 39.47; 102/103

[56] References Cited
UNITED STATES PATENTS

| | | | |
|---|---|---|---|
| 2,957,309 | 10/1960 | Kobbeman | 60/255 |
| 3,009,385 | 11/1961 | Burnside | 60/255 X |
| 3,108,433 | 10/1963 | De Fries et al. | 60/255 |
| 3,243,956 | 4/1966 | Hamm et al. | 60/255 |
| 3,407,595 | 10/1968 | Peterson | 60/255 |
| 3,426,528 | 2/1969 | Mangum et al. | 60/255 X |
| 3,700,762 | 10/1972 | Carpenter et al. | 102/103 |

Primary Examiner—C. J. Husar
Assistant Examiner—Robert E. Garrett
Attorney, Agent, or Firm—Stanley A. Marcus; Edward E. McCullough

[57] ABSTRACT

A solid propellant grain for a rocket is encased in and bonded to an elastomeric insulation sheath. Stresses that would occur between the propellant grain and the rocket case as a result of differential expansion and contraction if the grain were bonded to the case are eliminated by an expandible bearing sleeve that is bonded to the elastomeric sheath. The bearing sleeve is made of noncombustible material and comprises a series of overlapping segments that permit longitudinal motion of the propellant grain relative to the rocket case. The segments may be formed either by separate hoops or by a tape that is wound in a helical pattern on the elastomeric sheath. Since the segments of the sleeve overlap, the rocket case is always protected from hot gases. Hence, the sleeve also functions as a part of the insulation for the rocket case.

7 Claims, 4 Drawing Figures

ROCKET MOTOR CONSTRUCTION

This invention was made under or during the course of Contract AF04(694)-926 with the U.S. Air Force.

BACKGROUND OF THE INVENTION

This invention relates broadly to solid propellant rocket motors. Particularly, it relates to methods and apparatus for eliminating stresses ordinarily caused by differential expansion or contraction of the propellant grain and the case to which it is bonded.

A continuing problem with solid propellant rocket motors, particularly those of the end burning type, is that most solid propellants tend to shrink to a much greater degree than the rocket motor case to which they are customarily bonded, during their curing process and also when subjected to lowered ambient temperatures.

Conventional methods of obviating these stresses have included the use of a plurality of layers of insulaton surrounding the propellant grain. These layers are bonded together and to the case of the rocket only at the forward end thereof to permit longitudinal movement of the propellant grain relative to the case as it shrinks or expands. This method tended to add an unacceptable amount of inert weight to the rocket and to diminish the quantity of propellant that could be loaded into the case.

The present invention provides a solution to this problem by a means that is both lighter in weight and easier to manufacture.

SUMMARY OF THE INVENTION

In a solid propellant rocket motor, an elastomeric sheath of insulation is bonded to the surface of the solid propellant grain adjacent the rocket case. A bearing sleeve is bonded to the surface of this sheath and is made of overlapping segments; so that, as the propellant grain expands, there are no gaps in the material between the sheath and the rocket case. Hence, the bearing sleeve not only permits longitudinal movement of the propellant grain relative to the rocket case, but also functions as part of the thermal insulation for the case.

As used herein, the term "segment" means one of the series of short components of the bearing sleeve as it appears in longitudinal section (as shown in FIGS. 2 and 3). Each segment of the bearing sleeve has at least one forwardly-extending flange and at least one aftwardly-extending flange positioned so that the forward flange will overlap the aft flange of the adjacent segment. The segments may be formed either by separate hoops that surround the propellant grain over the sheath or by tape having the cross-sectional configuration of the segments and wound upon the sheath in a helical pattern.

The surfaces of the bearing sleeve that contact the rocket case may be coated at 19 with Teflon (polytetrafluoroethylene) or other lubricating material.

The invention is made by fitting the insulaton sheath over a mandrel that has the same dimensions as would the propellant grain at the lowest ambient temperature for which it is intended. The hoops, made of fiberglass impregnated with a cured resin, are then fitted over the sheath and bonded thereto. Alternatively, a continuous tape having the same cross section as the hoops may be wound in a helical pattern on the surface of the sheath and bonded thereto. The sheath is then removed from the mandrel, placed in the rocket case, stretched to an appropriate length, and filled with uncured propellant. The propellant is then typically cured by being subjected to elevated temperatures.

Objects of the invention are to provide a means for obviating any stresses that may occur between a solid propellant rocket grain and its case; and to provide such a means that is easy to manufacture, light in weight, and reliable in operation. Important features of the invention are that the stress release mechanism also functions as a thermal insulation, and that it is made of readily available materials.

Other objects and features of the invention will become apparent as the following detailed description is read with reference to the accompanying drawings. Identical parts are designated by the same numbers throughout the disclosure.

DESCRIPTION OF THE PREFERRED EMBODIMENTS

Figure 1:
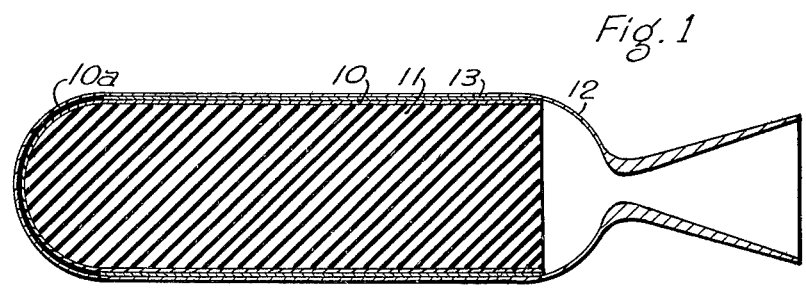
FIG. 1 is a longitudinal section of a typical, solid propellant rocket motor in which the invention is installed.

In the present invention, an elastomeric insulaton sheath 10 is bonded to the propellant grain 11 and covers the surface thereof adjacent the rocket case 12. This sheath 10 is typically a high-temperature rubber, such as Buna-N rubber. The forward end portion 10a of the sheath 10 is bonded into the forward end of the rocket case 12. A bearing sleeve 13 is, in turn, bonded to the cylindrical surface of the elastomeric sheath 10. The bearing sleeve 13 is made, in the preferred embodiment, of fiber glass impregnated with a high-temperature resin, typically a phenolic.

Figure 2:
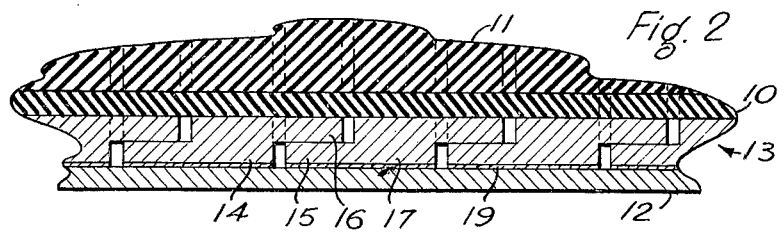
FIG. 2 is a longitudinal section, enlarged, of an edge portion of FIG. 1.
Figure 3:
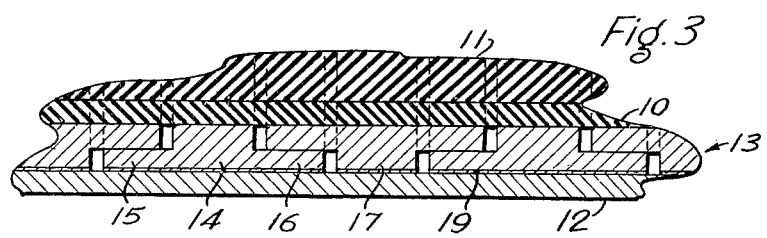
FIG. 3 is a longitudinal section similar to FIG. 2, but showing an alternative embodiment of the hoops or tape surrounding the insulation sheath.

The bearing sleeve 13 is formed by a series of overlapping segments 14. The segments 14 are parallelograms in cross section and each has a forwardly extending flange 15 and an aftwardly extending flange 16. These flanges 15 and 16 may extend from opposite sides of each segment 14 relative to the axis of the rocket, as shown in FIG. 2, so that all segments 14 are identical in cross section. Alternatively, they may extend from the same side so that each segment has the reverse image of its adjacent segments as shown in FIG. 3. Also, each segment 14 may have a plurality of flanges 15 and 16.

The thickness of each forward flange 15 plus each aft flange 16 equals that of its segment 14, so that each forward flange 15 may overlap the aft flange 16 of the adjacent segment 14 without leaving a lateral gap. Hence, as the segments 14 are moved apart by expansion of the propellant grain 11, there is never a longitudinal gap in the bearing sleeve 13. For this reason, the bearing sleeve 13 also functions as a part of the thermal insulation that protects the rocket case 12. If each segment 14 has a plurality of forward flanges 15 and aft flanges 16 (not shown), they are arranged to mesh with those of adjacent segments 14 in the manner of mortise joints.

The segments 14 of the bearing sleeve 13 may be formed either by separate hoops 17 or by adjacent coils of an unbroken tape 18 having the cross-sectional configuraton of the segments 14 and wound in a helical pattern on the sheath 10. The embodiment of the bearing sleeve shown in FIG. 2, although shown formed by hoops 17, may be made by helical winding of a single tape 18 on the sheath 10, and that of FIG. 3 may be made by alternate helical windings of two tapes 18.

The outer surface of the bearing sleeve 13 may be coated with Teflon (polytetrafluoroethylene) 19 or other material having suitable lubricity to facilitate movement of the propellant grain 11 relative to the rocket case 12.

Figure 4:
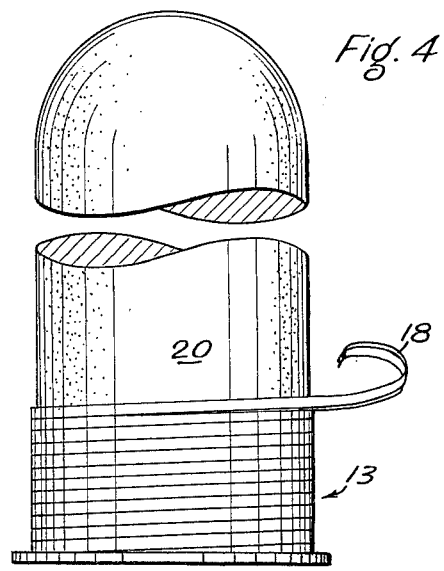
FIG. 4 is a side elevation of a mandrel showing the invention being manufactured thereon.

The invention may be manufactured in the following way: A mandrel 20 having the dimensions desired for the propellant grain at its lowest ambient operating temperature is formed from a mixture of polyvinyl alcohol and sand, and allowed to solidify (See FIG. 4). The elastomeric insulation sheath 10 is then placed over the mandrel 20, and the sheath 10 is coated with an adhesive composition. The bearing sleeve 13 is formed either by placing the separate hoops 17 one by one on the adhesive surface or by winding the tape 18 thereon in a helical pattern as described above. Care is taken not to bond the segments 14 to each other. The sheath 10 is then removed from the mandrel 20, stretched to receive the quantity of uncured propellant necessary to provide a propellant grain 11 of the desired size when cured and exposed to its lowest ambient temperature, and placed in the rocket case 12. It is then filled with propellant and placed in an oven where the propellant is cured at elevated temperatures.

An invention has been described that provides an advance in the art of rocket construction. Although the embodiments have been described with considerable specificity with regard to detail, it should be noted that details may be altered without departing from the scope of the invention as it is defined in the following claims.

The invention claimed is:

1. In a rocket motor that includes a case and a solid propellant grain therein, the improvement comprising:
    an elastomeric sheath surrounding and bonded to the propellant grain on surfaces thereof that are adjacent the case; and
    a bearing sleeve of noncombustible material bonded to the elastomeric sheath, and unbonded to the case, the bearing sleeve comprising a series of overlapping segments, whereby longitudinal expansion and contraction of the propellant grain relative to the case are permitted without harmful stress.

2. The rocket motor of claim 1 wherein the elastomeric sheath is bonded to the rocket case at the forward end portion thereof.

3. The rocket motor of claim 1 wherein each segment of the bearing sleeve has at least one flange extending forwardly and at least one flange extending aftwardly, such that a forward flange of each segment may overlap an aft flange of its adjacent segment, so that, as the segments are moved apart by expansion of the propellant grain, gaps between segments may always be covered by the flanges, whereby the bearing sleeve may also function as a part of the thermal insulation for the rocket case.

4. The rocket motor of claim 1 wherein the segments of the bearing sleeve are separate hoops.

5. The rocket motor of claim 1 wherein the bearing sleeve is made of fiber glass impregnated with resin.

6. The rocket motor of claim 5 wherein the resin is a cured phenolic.

7. The rocket motor of claim 1 further including a coat of polytetrafluoroethylene on the surface of the bearing sleeve adjacent the rocket case, to facilitate relative movement thereof.

* * * * *